F. N. BUCKMAN.
WICK TRIMMING DEVICE.
APPLICATION FILED DEC. 15, 1908.
920,822.
Patented May 4, 1909.
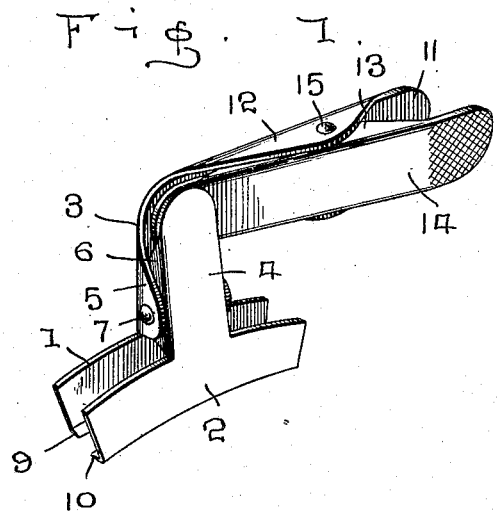
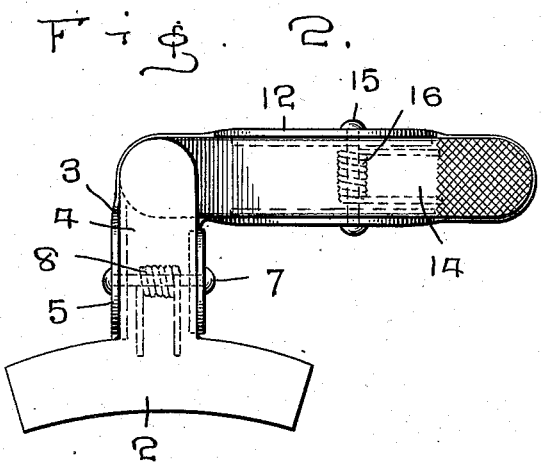
WITNESSES:
Thos. W. Riley
M. A. Newcomb
INVENTOR
F. N. Buckman
BY
W. J. FitzGerald & Co.
Attorneys

UNITED STATES PATENT OFFICE.

FREDERICK N. BUCKMAN, OF GREEN BAY, WISCONSIN.

WICK-TRIMMING DEVICE.

No. 920,822.    Specification of Letters Patent.    Patented May 4, 1909.

Application filed December 15, 1908. Serial No. 467,718.

*To all whom it may concern:*

Be it known that I, FREDERICK N. BUCKMAN, a citizen of the United States, residing at Green Bay, in the county of Brown and State of Wisconsin, have invented certain new and useful Improvements in Wick-Trimming Devices; and I do hereby declare the following to be a full, clear, and exact description of the invention, such as will enable others skilled in the art to which it appertains to make and use the same.

My invention relates to new and useful improvements in wick trimming devices and more particularly to that class adapted to be used for trimming lamp wicks and my object is to provide a device, which when properly operated, will remove the burned portion of a wick.

A further object is to so construct the parts of the trimmer that the wick will be uniformly trimmed and a further object is to provide means whereby the trimmer proper may be extended into engagement with the wick without bringing the hands of the operator in close proximity thereto.

Other objects and advantages will be hereinafter referred to and more particularly pointed out in the claim.

In the accompanying drawings forming part of this application, Figure 1 is a perspective view of the trimmer, showing the same in its open position, and, Fig. 2 is a side elevation thereof.

Referring to the drawings in which similar reference numerals designate corresponding parts throughout the several views, 1 and 2 indicate paralleling jaws, which jaws are preferably curved and form segments of circles, said jaws being provided at their longitudinal center with upwardly extending standards 3 and 4, each of said standards being provided with inwardly extending ears 5 and 6, respectively, said ears being arranged in pairs and the ears 5 spaced a sufficient distance apart to receive the ears 6, which ears are pivotally secured together by extending a bolt, or the like, 7, laterally therethrough. In this manner, the jaws 1 and 2 are hingedly secured together and are normally held away from each other by means of a spring 8, said spring being coiled around that portion of the bolt 7 between the ears 6, the free ends of the spring being placed in engagement with the inner faces of the jaws 1 and 2, respectively, thus directing outward pressure on the jaws and normally holding the same in their separated positions.

The lower edges of the jaws are extended inwardly and tapered to form knives 9 and 10, respectively, which knives are adapted to co-act with each other and sever the wick when the upper ends of the standards 3 and 4 are swung outwardly and in view of the curvature of the jaws 1 and 2, the wick will likewise be given a uniform curvature and thereby properly spread the flame when the wick is ignited. The upper end of the standard 3 terminates in a laterally extending handle 11, which handle is provided in its length with a pair of ears 12, between which extend a similar pair of ears 13 of a latch 14, said ears being pivotally secured together by extending a bolt or similar object 15 laterally through said ears 12 and 13.

The inner end of the latch 14 is extended into engagement with the inner face of the standard 4, so that when the outer end of the latch is swung toward the outer end of the handle 11, the jaws 1 and 2 will be moved toward each other, the handle and latch being of such length as to enable the operator to extend the jaws into engagement with the wick without bringing the hands of the operator into too close proximity to the flame on the wick. The inner end of the latch 14 is normally held in close proximity to the inner face of the handle 1 by coiling a spring 16 around the bolt 15 and extending its ends against the inner faces of the handle 11 and latch 14, respectively, the outward pressure of said spring normally holding the latch in its initial position.

In applying the device to use, the jaws 1 and 2 are placed in position on opposite sides of the wick to be trimmed, when inward pressure is directed on the outer end of the latch 14 and said latch thus swung upon its pivot bolt 15, this action moving the upper end of the standard 4 outwardly and bringing the knives 9 and 10 into engagement with the wick, the continued pressure on the outer end of the latch causing the knives 9 and 10 to sever the wick and if desired, the jaws may be held in their closed positions and the severed portion of the wick deposited at any suitable point desired. In placing the jaws in position to sever the wick, particular care should be taken to extend the handle as nearly in a horizontal position as possible, so that when the jaws have been operated, the wick will be trimmed at the proper angle.

The several parts of my improved device can be made of sections of flat metal and properly bent into shape, thereby enabling me to cheaply produce the device and at the same time render the same strong and durable and practically indestructible.

I claim:

The approximately T-shaped jaws having their lower portions of segmental outline, the bottom edges of said lower portions being provided with inwardly extending cutting edges conforming to the segmental outline of said lower portions, the upwardly extending portions or stems of said jaws being pivotally connected together, means for resiliently holding said jaws normally apart, one of said stems being provided with a handle extending laterally therefrom and a latch having its inner end resiliently held against the inner side of the upper end of one of said stems, said latch being pivoted to said handle.

In testimony whereof I have signed my name to this specification in the presence of two subscribing witnesses.

FREDERICK N. BUCKMAN.

Witnesses:
P. CHRISTENSEN,
JOS. J. THOR.